E. PAULSON.
SHOCK CARRIER.
APPLICATION FILED JUNE 24, 1913.
1,103,311.
Patented July 14, 1914.
2 SHEETS—SHEET 1.
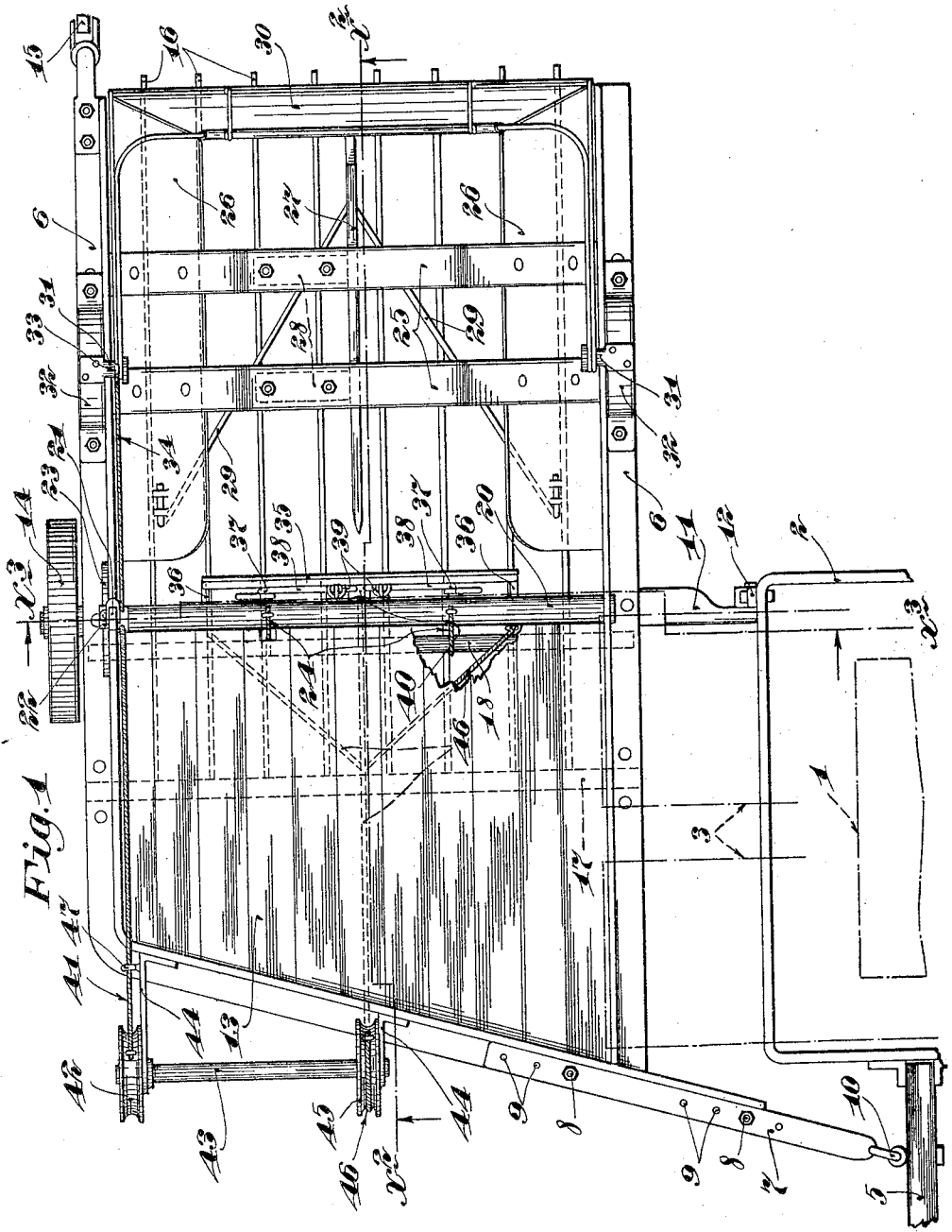
Witnesses:
Geo. Knutson
E. C. Skinkle
Inventor:
Erland Paulson
By his Attorneys,
William Merchant

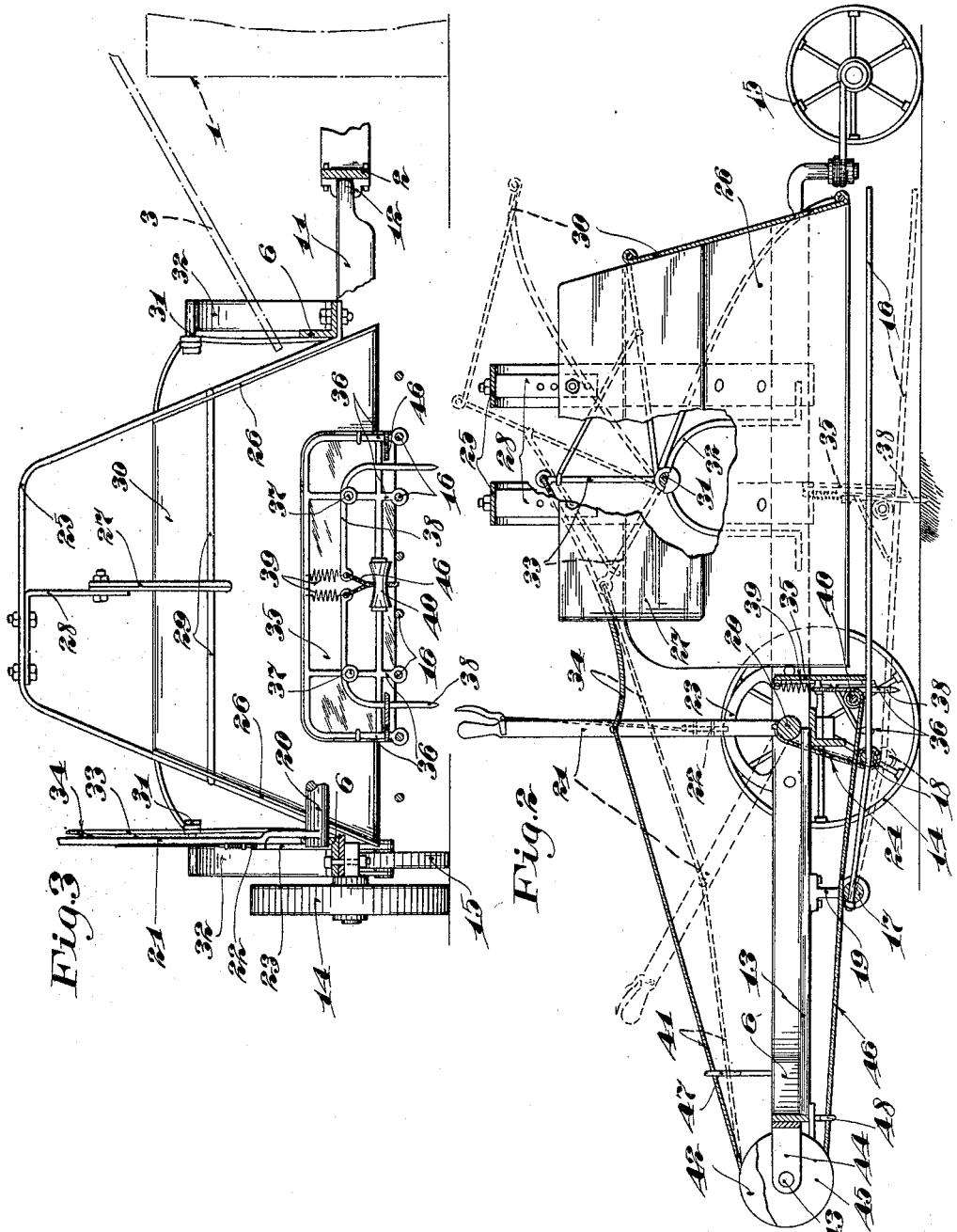

UNITED STATES PATENT OFFICE.

ERLAND PAULSON, OF KNIFE RIVER, NORTH DAKOTA.

SHOCK-CARRIER.

1,103,311.	Specification of Letters Patent.	Patented July 14, 1914.

Application filed June 24, 1913. Serial No. 775,528.

*To all whom it may concern:*

Be it known that I, ERLAND PAULSON, a citizen of the United States, residing at Knife River, in the county of Dunn and State of North Dakota, have invented certain new and useful Improvements in Shock-Carriers; and I do hereby declare the following to be a full, clear, and exact description of the invention, such as will enable others skilled in the art to which it appertains to make and use the same.

My present invention relates to shock carriers adapted for use in connection with harvesters, and is in the nature of an improvement on the device disclosed and claimed in my prior Patent 1,057,768 of date, April 1st, 1913, entitled "shock carrier."

In the accompanying drawings which illustrate the invention, like characters indicate like parts throughout the several views.

Referring to the drawings, Figure 1 is a plan view of the carrier, some parts being broken away and some parts of the harvester being indicated in connection therewith; Fig. 2 is a section taken approximately on the line $x^2$ $x^2$ on Fig. 1, some parts being broken away; and Fig. 3 is a transverse vertical section taken approximately on the line $x^3$ $x^3$ on Fig. 1.

Of the parts of the harvester, it is only desirable for the purposes of this case to note the traction wheel 1 (indicated by dotted lines in Figs. 1 and 3), the harvester frame 2 and the binder deck 3, the latter being indicated by dotted lines in Figs. 1 and 3, and the pole 5.

The framework of the bundle carrying attachment is indicated as an entirety by the numeral 6, it being preferably formed from angle iron bars, the laterally spaced members of which project rearwardly with clearance space between them. At its front end, the frame 6 is provided with an anchor bar 7 detachably connected thereto by bolts 8 and longitudinally spaced bolt holes 9. The projecting end of the anchor bar 7 is loosely hinged to the pole 5 by a flexible joint 10. Rigidly secured to the intermediate portion of the inner bar of the frame 6, is a short stiff arm 11 that is pivotally connected to a bearing 12 on the rear adjacent side of the harvester frame 2. The front portion of the frame 6 carries a large operating platform 13 located below the upturned flanges of the bars of the said frame, so that it affords a deck or pan to receive and hold loose grain which may be shaken from the bundles as they are delivered from the binder deck 3 onto the said bundle receiving platform 13.

The inner side of the frame 6 is supported by the binder frame through the connections just described, but to carry the outer portion of said frame 6, I provide the same at its outer side with an intermediately located wheel 14, and at the rear portion of its outer side a caster wheel 15.

Working vertically between the rearwardly projecting side bars of the frame 6, with its front portion underlying the rear portion of the bundle receiving deck 13, is a so-called drop deck, which, for important reasons, is made up of a multiplicity of long laterally spaced bars or rods 16 unconnected at their rear ends, but at their forward ends, securely tied together by a pair of transverse tie bars 17 and 18. The front tie bar 17, at its ends, is journaled in bearing brackets 19 secured to and depending from the side bars of the frame 6, below the intermediate portion of the receiving deck 13.

Journaled in the side bars of the frame 6, at the rear edge of the receiving deck 13, is a windlass shaft 20. At its outer end, this windlass shaft 20 is provided with an operating lever 21 having a latch 22 that coöperates with the lock segment 23 fixed to the outer bar of the frame 6. One or more cables 24 connect the said windlass shaft 20 to the rear tie bar 18 of the drop deck 16. Normally, the lever 21 will be locked in the position shown in Fig. 2, in which position it holds the drop deck 16 in an elevated position indicated by full lines in said Fig. 2.

Upwardly bound arch bars 25 are secured at their ends to the side bars of the frame 6 and span the intermediate portion of the drop deck 16 rising sufficiently high above the same to permit the accumulation of a shock or bundles on the said deck. Oblique side boards 26 are secured to the sides of the said arch bars 25. A divider plate or board 27 extends longitudinally over the central portion of the drop deck 16, and is rigidly secured from the arch bars 25, as shown, by means of brackets 28.

The numeral 29 indicates resilient packer bars, the front ends of which are suitably attached to the side boards 26, and the rearwardly extended ends of which converge and tend to maintain engagement with the divider board 27. These packer arms 29 tend to keep the bundles pressed against the divider board as they are accumulated on the drop deck 16, but are readily sprung outward under the action of the accumulating shock.

Extended across the shock carrier, above the rear end of the drop deck 16, is a so-called tail gate 30 having laterally spaced forwardly projecting arms, the front ends of which are pivotally connected at 31 to bearing brackets 32 rigidly secured on the side bars of the frame 6. At one side, the tail gate 30 is provided with a braced arm 33 which is connected by a cable 34 to the lever 21, and normally, has some slack therein. Normally, also, of course, the tail gate 30 is in its closed position, shown by full lines in Figs. 1 and 2.

As an important feature of this invention, I mount a so-called shock ejector for sliding movements on the rods or bars of the drop deck 16, and provide means for anchoring the same to the ground while the machine is moving forward for a limited distance. As shown, this so-called shock ejector comprises a plate 35 with longitudinally spaced legs 36 that are perforated so that they slide freely on the rods of the drop deck 16. Intermediately pivoted to the back of the ejector plate 35, at 37, is a pair of ground engaging anchors 38, the depending ends of which are adapted to be projected into the ground. The inturned free ends of the said anchors 38 are yieldingly drawn upward by coiled springs 39 attached thereto, and to the top of the ejector plate 35. Journaled to suitable bearings on the lower central portion of the front of the ejector plate 35 is a guide roller 40.

The numeral 41 indicates an operating cable which is attached to the lever 21 and to a drum 42 secured to one end of a counter shaft 43 journaled in brackets 44 on the front bar of the frame 6. This shaft 43 carries a second sheave 45 to which an operating cable 46 is attached at its front end. The rear end of the cable 46 passes under the ground roller 40 and, as shown, has branches at its rear end attached to the inner ends of the anchors 38. The cables 41 and 46 are also preferably passed through perforated guides 47 and 48, respectively, secured on the front bar of the frame 6.

An operator with a fork will stand on the bundle receiving platform 13 and will transfer the bundles from the said platform or deck 13 onto the drop deck or dumping platform 16, placing the bundles, of course, butt end downward on the bars of the said drop deck. Preferably, the bundles are accumulated on the deck 16 by depositing one, first on the one side and then one on the other side of the divider board 27. The inclined tail board 30 and the inclined side boards 26 cause the outer bundles of the shock to incline inward, as is required in forming a good shock.

After the shock has been accumulated, it may be deposited onto the ground by actions, all of which are controlled simply by drawing forward the lever 21. The initial part of the forward movement of the lever 21 causes the rear portions of the bars of the drop deck 16 to be lowered to the ground, carrying with it the shock ejector 35. Also, the slack thus given to the cable 46 permits the springs 39 to throw the depending points of the anchors 38 into the ground, thereby causing the said ejector temporarily, to remain stationary on the ground, while the machine moves forward.

Because of the normal slack in the cable 34, the tail gate will not be raised by a forward movement of the lever 21 until after the drop deck 16 has been lowered, the ejector 35 has been anchored to the ground, and the rods of the said deck 16 moved somewhat forward in respect to the said anchored ejector. This will cause the proper compression or forcing together of the bundles forming the shock, before they are discharged from the machine. Lowering of the drop deck 16 will set the butt ends of the bundles on the ground, so that the bars of the drop deck will be drawn out from under the same. The shock ejector, however, insures proper initial movement of the shock. The continued forward movement of the lever 21, of course, raises the tail gate 30 to an elevated position indicated by dotted lines in Fig. 2, so that the shock will be passed out of the machine after it has been set upon the ground.

When the machine moves forward, so that the anchored shock ejector is approximately in the position shown by dotted lines in Fig. 2, the cable 46 will be drawn taut, thereby pulling the inner ends of the anchors 38 downward and thereby retracting the anchors from the ground so that the ejector may then move forward with the machine. Obviously, the rearward movement of the lever 21 will permit the tail gate to drop to its normal position and will raise the drop deck 16 and move the shock ejector back to its normal position, with the anchors held in a retracted position.

The purpose of making the bar 7 adjustable transversely of the front portion of the carrier frame 6, is to adapt it for application to poles or other parts at the front of the harvester frame to which it is adapted to be attached, and which parts, in different arrangements, are located in different positions transversely of the machine.

In harvesting flax, the flax will be cut by the use of a harvester having the trip removed and without the use of twine, so that the flax will be loosely deposited on the receiving deck 13, from whence it may be thrown with a fork onto the so-called drop deck 16. When the machine and attachment are thus used, the divider board 27 should be detached from the arch bars 25. The said divider board is intended for use only when accumulating bundles to form a shock, and when thus used, it serves to keep the central portion of the shock erect and in proper form.

What I claim is:

1. In a bundle carrier, a drop deck having bars movable into contact with the ground, and a shock ejector permanently and movably mounted on the bars of said drop deck and provided with an anchor for temporarily anchoring the same to the ground.

2. In a bundle carrier, the combination with a drop deck having bars adapted to be dropped into contact with the ground, of a shock ejector mounted to slide on the bars of said deck, an anchor on said ejector for anchoring the same to the ground, and a lever on said carrier connected to said ejector and anchor and controlling the operations thereof.

3. In a bundle carrier, the combination with a drop deck having bars adapted to be dropped into contact with the ground, of a shock ejector mounted to slide on the bars of said deck, an anchor on said ejector for anchoring the same to the ground, a lever on said carrier connected to said ejector and anchor and controlling the operations thereof, a tail gate at the rear of said drop deck, and a connection to said lever for operating said tail gate.

4. In a bundle carrier, the combination with a drop deck having bars adapted to be dropped into contact with the ground, of a shock ejector mounted to slide on the bars of said deck, an anchor on said ejector for anchoring the same to the ground, a lever on said carrier connected to said ejector and anchor and controlling the operations thereof, a tail gate at the rear of said drop deck, a connection to said lever for operating said tail deck, the connection between said lever and tail gate having such normal play that under movement of said lever, said drop deck will first be lowered and said anchor engaged with the ground, and said gate will subsequently be raised.

5. In a bundle carrier, the combination with a drop deck having bars adapted to be dropped into contact with the ground, of a shock ejector mounted to slide on the bars of said deck, a ground engaging anchor on said ejector, a lever, and lever actuated connections operative to control the vertical movements of said deck and of said anchoring device, and limiting the movements of said ejector, in respect to said deck.

In testimony whereof I affix my signature in presence of two witnesses.

ERLAND PAULSON.

Witnesses:
BERNICE G. WHEELER,
HARRY D. KILGORE.

Copies of this patent may be obtained for five cents each, by addressing the "Commissioner of Patents, Washington, D. C."